Patented Feb. 20, 1934

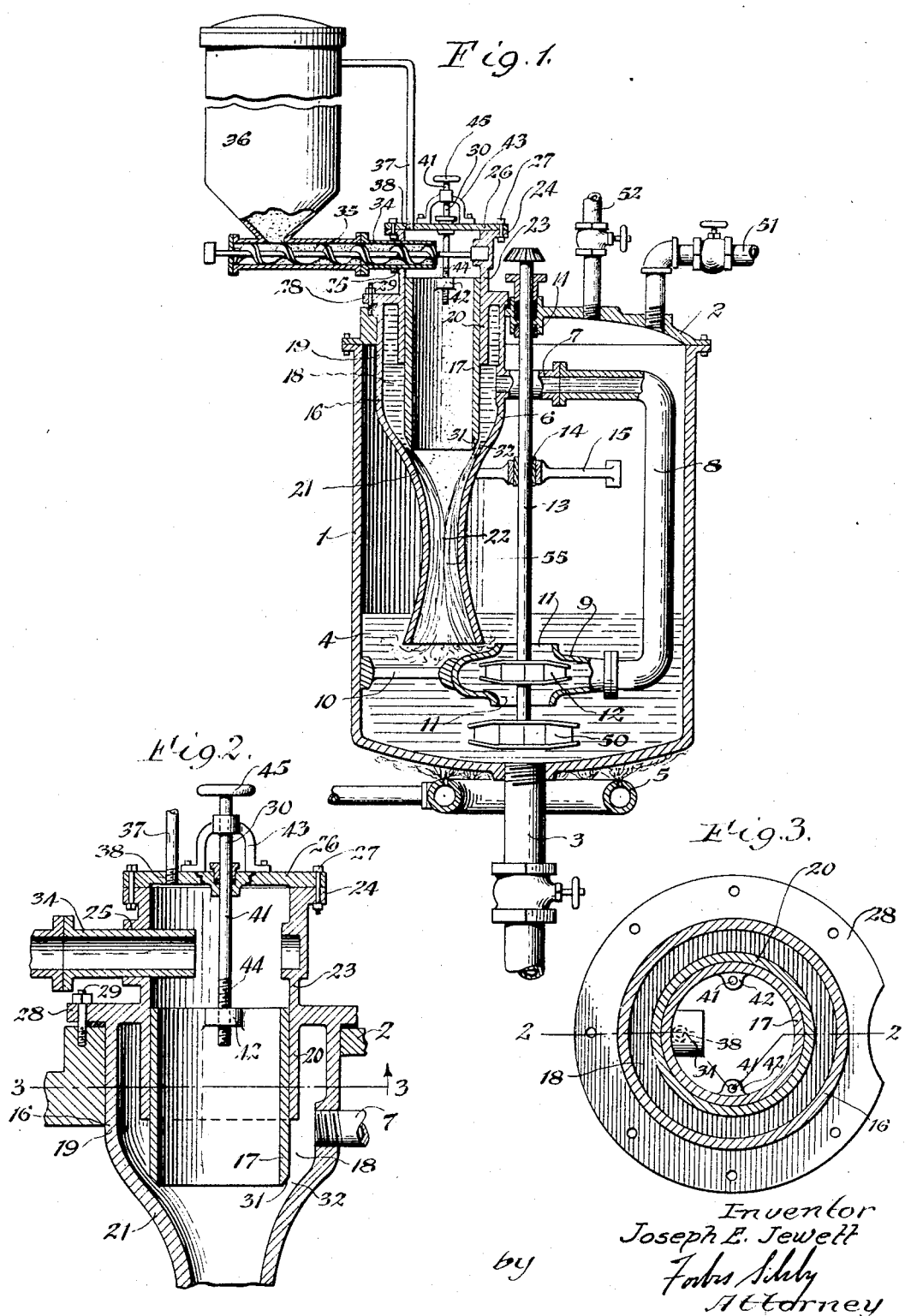

1,947,852

UNITED STATES PATENT OFFICE 1,947,852

METHOD OF CONDUCTING CAUSTIC ALKALI FUSIONS

Joseph E. Jewett, Buffalo, N. Y., assignor to National Aniline and Chemical Company, Inc., New York, N. Y., a corporation of New York Application January 31, 1930. Serial No. 424,914

10 Claims. (Cl. 260—47)

This invention relates to the production of chemical compounds by a fusion process, and more particularly to a method of conducting fusions and apparatus therefor. It relates specifically to the manufacture of an organic compound by a fusion with caustic alkali.

In the manufacture of certain organic chemical products, such as indigo, indanthrone, dibenzanthrone, phenols, naphthols, etc., by processes well known to the art, an organic compound is fused with a caustic alkali. In practice, the fusion is brought about by adding the organic compound to a batch of the caustic alkali, and heating the resulting mixture with agitation.

In some cases, as for example, in the manufacture of indigo, the organic compound (for example, the potassium salt of phenylglycine) is added in the form of a comminuted solid to substantially anhydrous caustic alkali, which is in molten condition and contains a dehydrating agent (such as sodamide) in admixture therewith. It is highly important that the phenylglycine compound rapidly be brought into admixture and reaction with the dehydrating agent, otherwise the yield of final product is decreased, inasmuch as the phenylglycine compound decomposes to give undesired byproducts when subjected, out of contact with the dehydrating agent, to the high temperature of the molten caustic alkali. It has heretofore been difficult to obtain thorough admixture of the comminuted phenylglycine compound with the caustic alkali, because the phenylglycine compound, due to its lower density, tends to float on the surface of the caustic alkali. In addition, the comminuted phenylglycine compound forms a dust which does not become mixed with the dehydrating agent in the caustic alkali, and decomposes, causing a further loss in yield of the final product.

An object of the present invention is to provide a process and apparatus whereby an organic compound may be rapidly and intimately mixed with caustic alkali in the molten state.

Another object of the invention is to provide a process and apparatus for the manufacture of organic products by a fusion of an organic compound with caustic alkali whereby decomposition and side-reactions are inhibited and the yield of product is increased.

A further object of the invention is to provide a process and apparatus for the production of indoxyl by the interaction of a phenylglycine compound, a dehydrating agent and caustic alkali whereby the phenylglycine compound is rapidly and substantially completely brought into reactive contact with a reaction medium comprising the dehydrating agent and molten caustic alkali.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps all as will be exemplified in the following detailed disclosure and illustrated in the accompanying drawing. The scope of the invention will be indicated in the claims.

In the practice of the present invention, the objects thereof are accomplished by providing a process and apparatus for the production of an organic chemical product by a fusion of an organic compound with a caustic alkali whereby the caustic alkali, in molten condition, is caused to circulate in the form of a stream, and the organic compound is introduced into the circulating stream of molten caustic alkali.

In accordance with a preferred method of operating the process of the invention, intimate mixing of the organic compound and the molten caustic alkali, may be secured by forming the molten caustic alkali into a hollow figure, more particularly a hollow cone, passing the organic compound into the hollow of the figure, and agitating the mixture. The proportion of molten caustic alkali to organic compound may be such that at any time a relatively small amount of organic compound is being mixed with a relatively large amount of the molten caustic alkali, so that thorough intermixture and rapid reaction may be obtained. One form of apparatus embodying the invention, and providing for the carrying out of the process described above, comprises a system for circulating the caustic alkali in molten condition in the form of a stream, and means in the system for mixing the organic compound with the circulating stream of molten caustic alkali. In a preferred form of apparatus the mixing means comprises a mixing vessel having means for spreading the molten caustic alkali into the form of a hollow figure, more particularly a hollow cone, and means for introducing the organic compound into the hollow of said figure. Means for maintaining an atmosphere of inert gas in the mixing chamber, and means for maintaining a reduced pressure in the mixing chamber also may be provided.

For a fuller understanding of the nature and objects of the invention, reference should be had to the following detailed description taken in connection with the accompanying drawing in which Figure 1 is a sectional view of a form of apparatus embodying the invention, Figure 2 is a fragmentary section of the mixing vessel showing a form of adjusting mechanism, and Figure 3 is a sectional view of the mixing vessel taken along the line 3—3 of Figure 2.

Referring to the drawing, 1 is a closed fusion kettle having a cover 2 and a valve-controlled bottom outlet 3, and adapted to contain molten caustic alkali 4. Suitable heating means, shown as a gas burner 5, is provided for heating the kettle.

A mixing vessel 6 suitably supported within the upper portion of the kettle 1, as for example from the cover 2, has a side connection 7 to a pipe 8 within the vessel 1, which connects it with the discharge of a submerged centrifugal pump 9.

The pump 9, which is supported by brackets 10 suitably secured to the inner wall of the kettle 1, is shown as having a double intake 11. A single intake pump may also be employed, however, if desired. The rotor 12 of the pump 9 is mounted on a rotatable shaft 13 journaled in bearings 14, mounted in the cover 2 and a spider 15, respectively.

The mixing vessel 6 comprises an outer shell 16 and an inner cylindrical sleeve 17, forming an annular chamber 18.

The outer shell 16 comprises a cylindrical midportion 19, having an inner cylindrical lip 20, spaced from the interior wall of said mid-portion 19, and forming a guide for the sleeve 17; an inner tapered conical portion 21, forming a Venturi throat 22; an outer cylindrical collar portion 23, having a flanged edge 24 and a side wall opening 25; and a cover plate 26 secured to the flange 24, for example, by bolts 27.

A flange 28 on the shell 16 supports the mixing vessel from the cover 2, to which it is secured by suitable means, shown as stud bolts 29.

The sleeve 17 and the lip 20 are so constructed that a close sliding fit is obtained, and means 30 are provided for adjustably supporting the sleeve 17 from the cover 26. The sleeve 17 is of a larger diameter than the tapered conical portion 21 of the shell 16, and is tapered at its inner edge 31 to conform to the taper of said conical portion, forming an annular passage 32 between the inner edge 31 of the sleeve 17, and the interior wall of the shell 16.

A conveyor tube 34 carrying a screw conveyor 35, projects into the interior of the mixing vessel 6 through the opening 25 in the collar portion of the shell 16, and serves to introduce solid material from a container 36 into said mixing vessel. A pipe 37, connected to an opening 38 in the cover plate 26 of the shell 16, and leading to the upper portion of the container 36, serves to equalize the pressure in said container and the mixing vessel 6.

The adjustable means 30 for supporting the collar 17 may be any suitable mechanism. It is shown in the drawing as two rotatable spindles 41 cooperating with lugs 42 formed on the interior wall of the sleeve 17, diametrically opposite to each other. Each spindle 41 is journalled in a yoke 43, which is mounted on the coverplate 26, and which prevents the spindle from moving longitudinally. The inner end 44 of each spindle 41 is threaded to engage correspondingly threaded openings in lugs 42. Hand wheels 45 are provided for operating the spindles. This mechanism provides for longitudinal adjustment of the sleeve 17 within the shell 16, and accordingly enables the clearance between the end 31 of the sleeve and the interior wall of the shell 16 (that is, the width of the annular passage 32) to be controlled.

An impeller agitator 50 mounted on the same shaft 13 with the rotor 12 of the circulating pump 9, serves to stir the body of molten caustic alkali 4. Valved pipes 51 and 52, connected to the cover 2, respectively provide an inlet for the molten caustic alkali, and a vent for gases and vapors.

In utilizing the apparatus herein described for carrying out the process of the invention, kettle 1 is partially filled with caustic alkali (sodium or potassium hydroxide, or a mixture thereof) which is heated to a temperature above its melting point, and the circulating pump 9 is put into operation. The liquefied caustic alkali is pumped through the pipe 8 into the chamber 18 of the mixing vessel 6 from which it flows through the annular passage 32 and the Venturi throat 22 back to the main body of molten caustic alkali 4, the annular passage 32 causing the caustic alkali to take the form of a hollow cone 55. When circulation of the stream of molten caustic alkali through this circulating system has been established, the screw conveyor 35 is put into operation. Comminuted solid material fed into the mixing vessel 16 by the conveyor drops into the hollow of the cone of liquid caustic alkali 55 and rapidly becomes mixed with it.

The rapid flow of liquid caustic alkali through the Venturi throat 22 creates a partial vacuum in the interior of the cylinder 17, which draws any dust given off by the solid material down into the body of liquid caustic alkali 4. The turbulence produced in the Venturi throat 22 also assists in mixing the solid material with the liquid caustic alkali. Further mixing is effected by the agitator 50.

Control of the relative proportions of the solid material and molten caustic alkali may be had by regulation of the speed of feeding the solid material, by regulation of the speed of rotation of the pump 9, by variation of the size of the passage 32, or by other suitable means.

The operation of the process and apparatus hereinbefore described will be further illustrated in connection with its application to the production of indoxyl by the fusion of an alkali-metal salt of phenylglycine with a dehydrating agent and caustic alkali. It will be apparent, however, that the invention is not limited thereto and may be applied to the manufacture of other products by a fusion process; e. g., phenols, naphthols, hydroxyanthraquinones, indanthrones, dibenzanthrones, isodibenzanthrones, etc.

Molten caustic alkali (as for example, an equimolecular mixture of substantially anhydrous sodium and potassium hydroxides) containing a dehydrating agent (as for example, sodamide) in admixture therewith is caused to circulate in a stream through the pump 9, pipe 8 and mixing chamber 6, and a phenylglycine salt (as for example, the potassium salt of phenylglycine) is added in the form of a comminuted solid to the mixing vessel 6 from container 36. Owing to the turbulence and the suction produced by the circulation and the Venturi throat 22, the phenylglycine salt is rapidly mixed with the dehydrating material in the liquid caustic alkali and is brought into reaction therewith, producing indoxyl and ammonia gas. Due to the pressure within the cylinder 17 of the ammonia generated, and the Venturi suction produced by the circulation, the ammonia passes downward through the Venturi throat 22, carrying with it any dust formed by impact of the comminuted phenylglycine salt on the moving stream of molten caustic alkali.

By reason of the fact that the outlet of the mixing vessel 6 is considerably below the liquid level of the reaction mixture 4, any phenylglycine salt which does not react in the mixing vessel 6 and which tends to rise to the surface of the body of reaction mixture reacts further with the dehydrating agent in the body of reaction mixture 4.

The ammonia which is generated during the reaction and is drawn down into the body of reaction mixture 4 by the suction created in the mixing vessel, rises through the body of reaction mixture and passes out of the kettle 1 through the vent 52.

The passage of the ammonia through the reaction mixture assists the agitator 50 in further agitating the mixture to render it homogeneous. Consequently, the amount of unreacted phenylglycine salt which reaches the surface of the body of reaction mixture 4 in the kettle 1 and decomposes is relatively small.

The relative proportion of phenylglycine salt to liquid caustic alkali is preferably such that at any time a relatively small amount of phenylglycine salt is being mixed in the mixing vessel with a relatively large amount of liquid caustic alkali. The amount of dehydrating agent initially employed in admixture with the molten caustic alkali is preferably in slight excess of the amount theoretically required for reaction with the whole amount of phenylglycine salt to be reacted.

It will be realized that the invention is not limited to the process and apparatus and the details thereof above set forth. Thus the invention is applicable to all processes wherein a solid or liquid is mixed with a body of normally solid material in molten condition, and particularly to processes of manufacturing organic products wherein an organic compound is fused with caustic alkali.

The apparatus may comprise a circulating system and mixing vessel placed exteriorly of the kettle in which the main body of fusion mixture is contained, but for operating economies the arrangement shown in the drawing and hereinbefore described is preferred. Other forms of mixing apparatus, and particularly those which are adapted to form a hollow cone of liquid into which other liquid or solid material may be introduced, may be employed. In applying the invention to the manufacture of a product from a solid substance by a fusion process in which there is no evolution of gas upon contact of the reacting ingredients, an inert gas (such as, nitrogen, etc.) may be introduced into the interior of the mixing vessel to form a blanketing atmosphere and to assist in drawing dust produced in the mixing vessel into the body of reaction mixture.

When a gas is generated in, or introduced into, the mixing vessel, the main reaction kettle also may be placed under a vacuum, if desired, to assist in drawing the gas through the main body of reaction mixture. This is not essential however.

The invention, furthermore, is not limited to the details of the processes to which it may be applied, such as ingredients, proportions of ingredients, reaction temperature, pressure, time of reaction, and the like. Nor is it limited to the details of construction of the various parts of the apparatus disclosed.

A Venturi throat may or may not be included as a part of the mixing vessel. Its inclusion is preferred, however, because the suction produced by it increases the turbulence produced by the circulating stream of liquid caustic alkali at its junction with the main body of liquid caustic alkali, and aids in drawing gas present in the mixing chamber into the main body of caustic alkali. The inner wall of the mixing vessel, which has been illustrated as a cylindrical sleeve, may have a different form and may be adjustable relatively to the outer shell or not. Other methods of adjusting the inner cylindrical sleeve relatively to the outer shell may also be employed; the adjusting means illustrated is preferred, however, inasmuch as it leaves the center of the cylindrical sleeve unobstructed. Instead of a screw conveyor for feeding the solid material, other forms of feeding means may be employed. Furthermore, the invention is not restricted to the intermixture of a solid with fused caustic alkali but may be also employed for the treatment of a liquid by a fusion process as above indicated.

Other means for circulating the fusion mixture may be employed and said circulating means in whole or in part may be placed interiorly or exteriorly of the fusion kettle. The form of the invention hereinbefore exemplified, in which the circulating and mixing means are enclosed within the kettle, is preferred.

Since certain changes in the carrying out of the above process and in the construction, combination, and arrangement of the parts set forth may be made without departing from the scope of the invention, it is intended that all matter contained in the above description and shown in the accompanying drawing shall be interpreted as illustrative and not in a limiting sense, except as limited by the claims.

I claim:

1. In the manufacture of a chemical product by a process which includes fusing a material with caustic alkali, the improvement which comprises circulating the caustic alkali in molten condition in the form of a stream, and introducing said material into said stream of caustic alkali to form a mixture therewith.

2. In the manufacture of an organic chemical product by a process which includes fusing an organic chemical compound with caustic alkali, the improvement which comprises forming the caustic alkali in molten condition into a hollow figure, and introducing said organic chemical compound into the hollow in said figure.

3. In the manufacture of an organic chemical product by a process which includes fusing an organic chemical compound with caustic alkali, the improvement which comprises forming the caustic alkali in molten condition into a hollow moving cone, and mixing said organic compound with said moving cone of caustic alkali.

4. In the manufacture of an organic chemical product by a process which includes fusing an organic chemical compound with caustic alkali, the improvement which comprises circulating the caustic alkali in molten condition in the form of a stream, forming said circulating caustic alkali into a hollow figure, and mixing said organic compound with said figure of molten caustic alkali.

5. In the manufacture of an organic chemical product by a process which includes fusing an organic chemical compound with caustic alkali, the improvement which comprises circulating the caustic alkali in molten condition in the form of a stream, forming said circulating caustic alkali into a hollow cone, and mixing said organic compound with said cone of molten caustic alkali.

6. In the manufacture of an organic chemical product by a process which includes fusing an organic chemical compound with caustic alkali, the improvement which comprises circulating the caustic alkali in molten condition in the form of a stream, and mixing the organic compound with said circulating stream of caustic alkali while maintaining an atmosphere of inert gas in contact with the mixture.

7. In the manufacture of an organic chemical product by a process which includes fusing an organic chemical compound with caustic alkali, the improvement which comprises circulating the caustic alkali in molten condition in the form of a relatively large stream, forming said stream into a hollow cone, dropping the organic compound in the form of a relatively small stream into the hollow of said cone, and mixing said organic compound therewith.

8. In the manufacture of indoxyl by a process which includes fusing a phenylglycine compound with caustic alkali and sodamide, the improvement which comprises circulating in the form of a stream a body of reaction mixture containing caustic alkali in molten condition and sodamide, introducing said phenylglycine compound into said stream thereby forming indoxyl and ammonia, and maintaining the ammonia in contact with said mixture.

9. In the manufacture of indoxyl by a process which includes fusing a phenylglycine compound with caustic alkali and sodamide, the improvement which comprises circulating in the form of a stream a body of reaction mixture containing caustic alkali in molten condition and sodamide, introducing said phenylglycine compound into said stream, thereby forming indoxyl and ammonia, and maintaining a reduced pressure on the mixture.

10. In the manufacture of indoxyl by a process which includes fusing a phenylglycine compound with caustic alkali and sodamide, the improvement which comprises circulating in the form of a stream a body of reaction mixture containing caustic alkali in molten condition and sodamide, forming said reaction mixture into a hollow cone, introducing said phenylglycine compound into the hollow in said cone of reaction mixture thereby forming indoxyl and ammonia, reducing the pressure on the resulting mixture, and maintaining ammonia in contact therewith.

JOSEPH E. JEWETT.